United States Patent [19]

Nodfelt et al.

[11] Patent Number: 5,577,143
[45] Date of Patent: Nov. 19, 1996

[54] MULTI CHANNEL CONNECTOR

[76] Inventors: Ingvar Nodfelt, Målaregården 8, S-240 21 Löddeköpinge, Sweden; Bernd Stanitz, Rosenstrasse 2, D-6622 Wadgassen, Germany

[21] Appl. No.: 90,094
[22] PCT Filed: Jan. 29, 1992
[86] PCT No.: PCT/SE92/00054
  § 371 Date: Nov. 22, 1993
  § 102(e) Date: Nov. 22, 1993
[87] PCT Pub. No.: WO92/14178
  PCT Pub. Date: Aug. 20, 1992

[30] Foreign Application Priority Data

Jan. 30, 1991 [SE] Sweden .................................. 9100281

[51] Int. Cl.⁶ .................................................. G02B 6/38
[52] U.S. Cl. ................................................ 385/61; 385/59
[58] Field of Search .................................... 385/53, 55, 56, 385/58–61, 64, 71, 72, 78, 82, 89

[56] References Cited

U.S. PATENT DOCUMENTS

| | | | |
|---|---|---|---|
| 4,140,367 | 2/1979 | Makuch et al. | 385/59 |
| 4,217,030 | 8/1980 | Howarth | 385/64 |
| 4,252,406 | 2/1981 | Ryan, Jr. et al. | 385/59 X |
| 4,759,599 | 7/1988 | Yamaguchi et al. | 385/60 |

FOREIGN PATENT DOCUMENTS 2195786  4/1988  United Kingdom .................... 385/59

*Primary Examiner*—John D. Lee
*Attorney, Agent, or Firm*—Klarquist Sparkman Campbell Leigh & Whinston, LLP

[57] ABSTRACT

Multi channel connector for transmission means, preferably optical fiber ends, diodes or the like, equipped with lenses. The connector comprises two connector parts shaped for cooperation with at least one centering means for the centering of the transmission means. The centering means are respectively male and female shaped. The transmission means are each located in a related holder in both connector parts. Each holder has in limited extent radial mobility as well as axial mobility against the action of a spring in one for each connector part arranged respective channel, so that each holder is self-centering independent of the other holders.

4 Claims, 4 Drawing Sheets

5,577,143

MULTI CHANNEL CONNECTOR

The present invention refers to a multi channel connector for coupling-up the end portions of an in coupled up position opposite each other situated transmission means, such as preferably optical fiber ends, provided with lenses, diodes or the like, and which connector includes two connector parts, shaped for cooperation with a male and a female respectively shaped centering means for each of the transmission means for coaxial guiding and fixation of each transmission means regardless of the other transmission means.

THE BACKGROUND OF THE INVENTION

Known multi channel connectors of above mentioned type requires very high tolerances when manufacturing the closed parts, and then in particularly the case of the connector parts and linings, where the parallelism between the control hole for the transmission means to the optical fibers, the diode or the like must be within 0,001 mm, as well as the control hole and guide-pin for centering of connector among themselves. Further, the right angle between the end-surfaces of the connector parts and the longitudinal axis of the guiding holes must lie within ±0,002 mm, as well as the partition between the control hole and the guide pin respectively.

In order not to let the transmission means be able to change position, these are fastened permanently in the case of the connector parts by means of, for example forced fit. This implies that if the transmission means should be defective, these can not be exchanged, but the whole multi channel connector must be discarded and replaced with a new one.

Through the German Patent Specification No. 2743626, it is known that a number of optical fibers can be coupled up by means of a connector device. A problem with this connector device is, that the optical fibers consist of extremely thin fibres, with sizes of some micrometers. Because of this, it is extremely important that the centering is absolutely exact, since even very little deviations entails that the fiber ends lie side by, ie. they are not coaxial. When a number of fibers are placed in one channel, as it is the case with the above-mentioned invention, a poor centering is obtained.

THE OBJECT OF THE INVENTION

The purpose of the present invention is to provide a connector of the type mentioned by way of introduction, where the high demands for exact centering of the fiber end portions are fulfilled with appreciable simpler and cheaper means than earlier, where an exchange of in the connector part closed components, such as transmission means, is easily accomplished, and which connector is formed so that standard components present on the market can be used. Further, it is possible to place the end portions of the optical fibers and one or more LED:s, for cooperation with optical fibers, in one and same connector, and in one hand attain a accurate centering for all in a connector closed optical fibers and in the other attain that the holders consisting of two connector parts, in coupled up position, with their end surfaces come to bearing on each other, which further improves the coaxiality.

These problems are solved by placing the transmission means in the both connector parts in each belonging holder, which is limited extent has as well radial mobility as, by means of a spring, an axial mobility in each or connector parts arranged channels, so that each holder is self-centering regardless of the other holders.

DESCRIPTION OF THE DRAWINGS

The invention is explained closer hereinafter with reference to the enclosed drawings, which show an embodiment.

DESCRIPTION OF EMBODIMENTS

Figure 1:
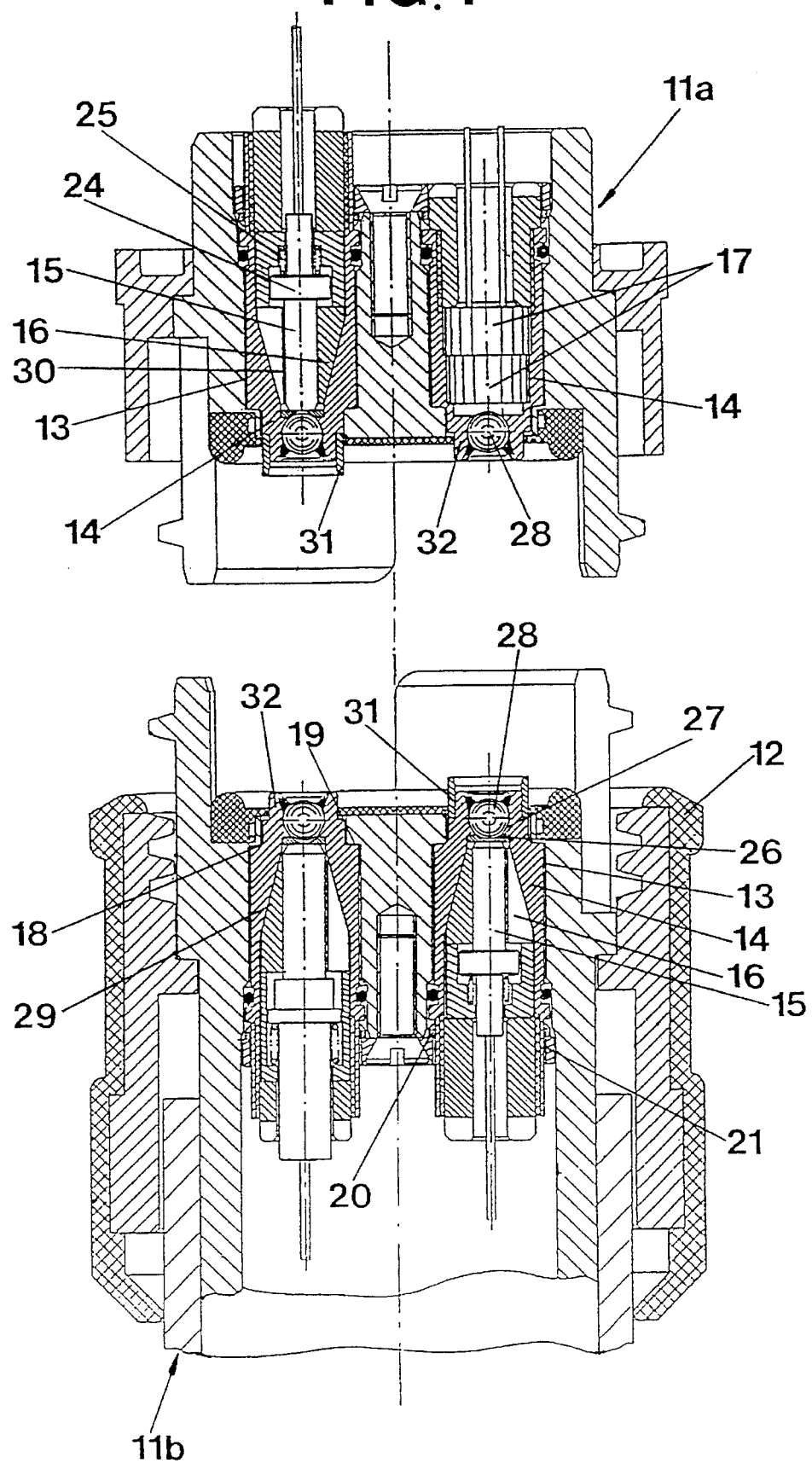
FIG. 1 shows in enlarged scale section through two connector parts of a multi channel connector, according to the invention, whereby both of the connector parts are slightly pulled apart from each other.
Figure 2:
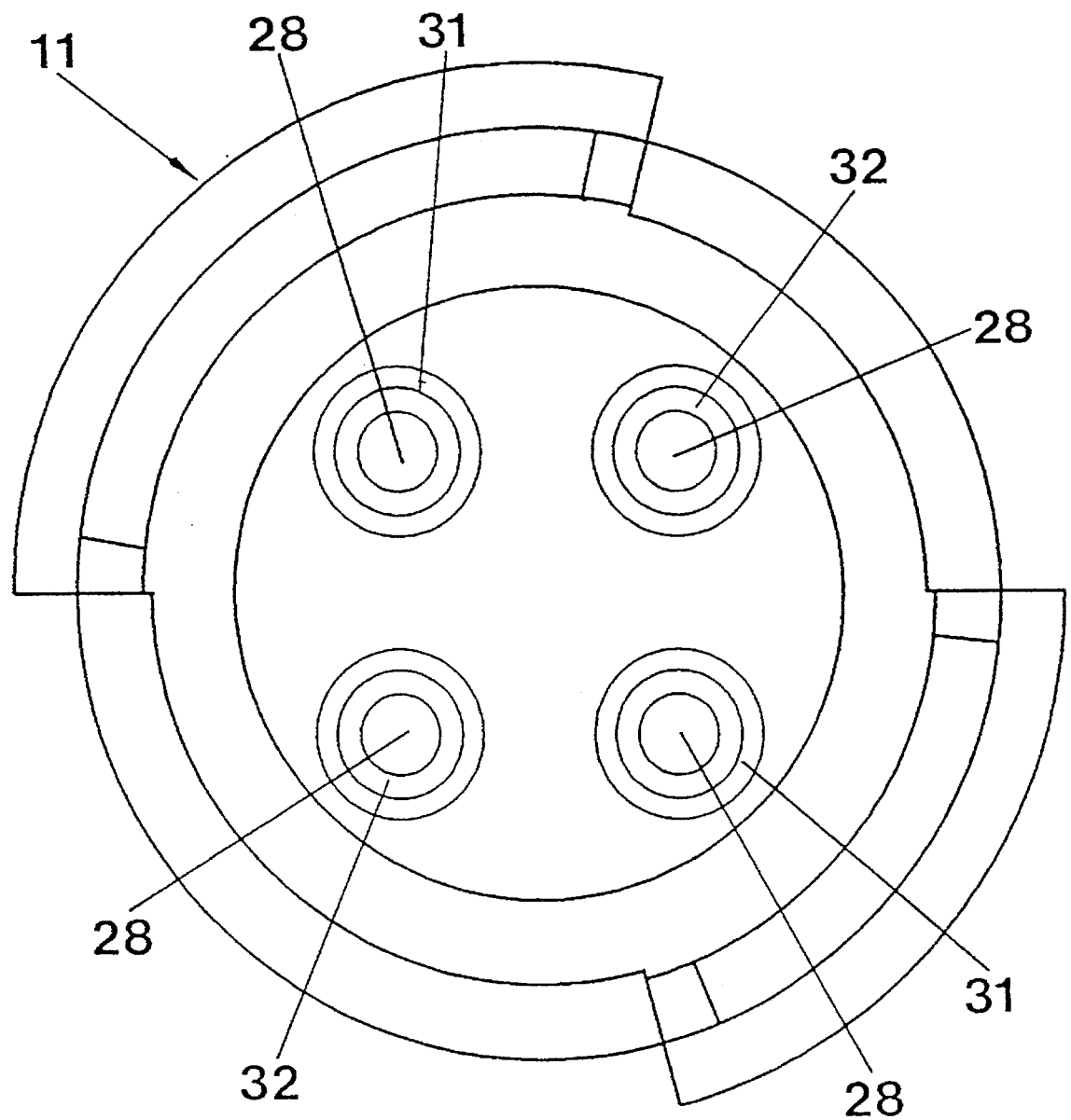
FIG. 2 shows a bottom view of one of the connector parts shown in FIG. 1.

The connector according to the invention consists of two connector parts 11a and 11b, which in a way previously known are insertable in each other and by means of a nut 12 fixable in theirs coupled-up position. Each of the connector part 11 is provided with a number of axial channels 13, in which a holder 14, with some play is inserted for each transmission device 15, via a centering one 16. The transmission means 15 can have the shape of a plug, in which the end portion of a optical fibre is situated, so that the end-surface of the fiber, coincide with one front end-surface of the plug. The transmission means 15 can also be a transmitter or a receiver for a diode 17.

The holder 14 is provided with a shoulder 18, which bears on a corresponding ledge 19 in the channel 13. The holder 14 is kept in its inserted position by means of a spring 20, which rests against a pressable holder-on 21, which is screwed-on by the connector part's posterior end surface. Thus it is possible, by means of the spring 20, to axially displace the holder 14 within the channel 13. Besides, the play between the holder and the channel is so high, that the holder can perform a limited radial motion.

Figure 4:
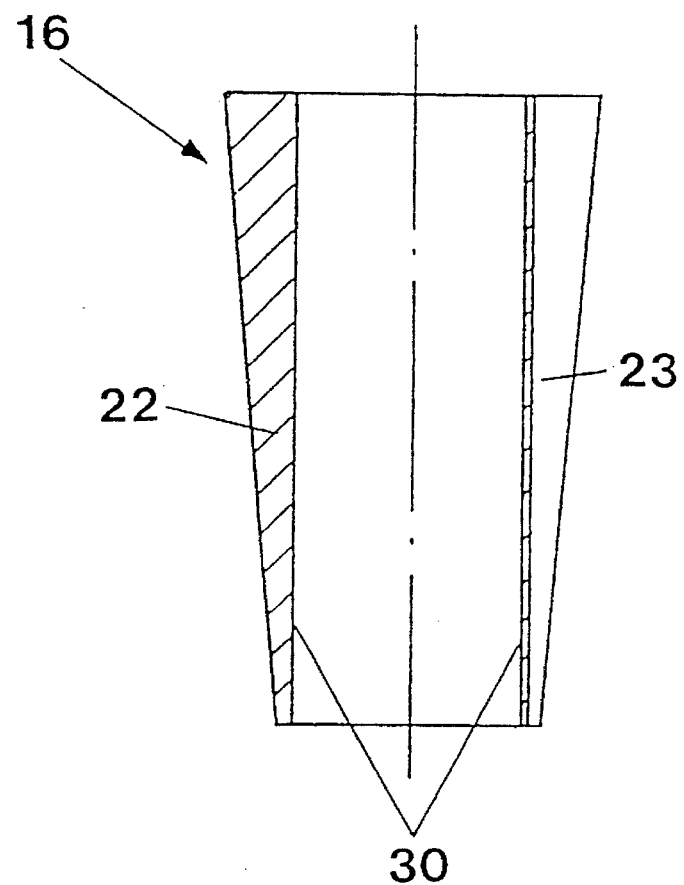
FIG. 4 shows a section along the line IV—IV in FIG. 3.
Figure 3:
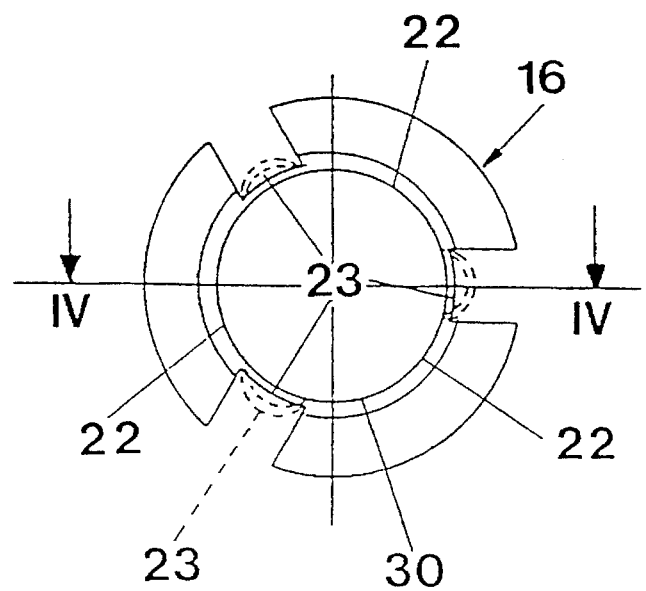
FIG. 3 shows a bottom view of a centering-cone, contained in the holder.
Figure 5:
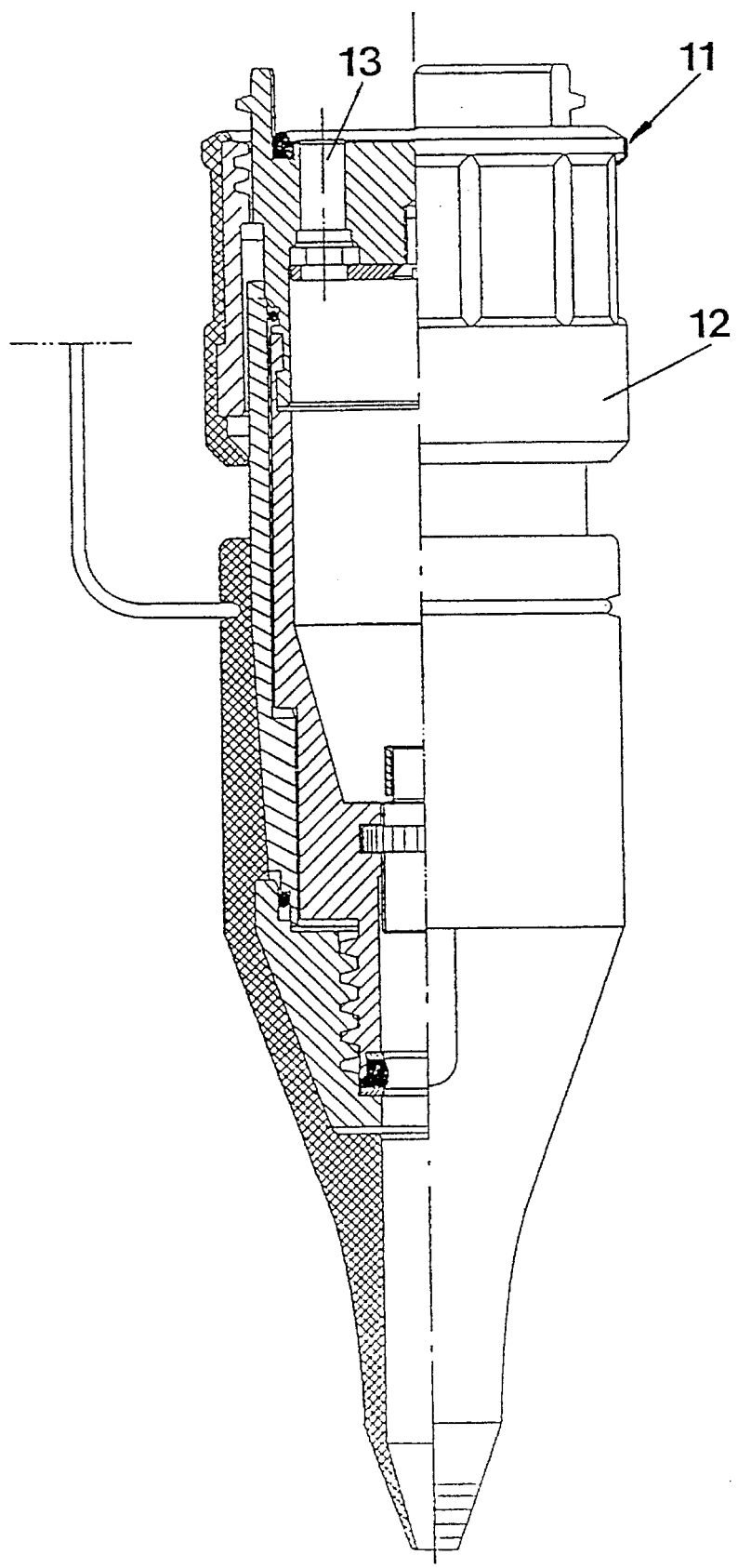
FIG. 5 shows partly in section a complete housing or a multi channel connector, but without holder and transmission means.

The transmission mean 15 is centered in the holder 14 with the centering-cone 16, the conic form of which corresponds the conical outlet 30 of the socket formed holder 14. Even the centering-cone has the shape of a socket and is provided with elastic sectors 22, consisting of material-reduced axial portions 23, which is apparent from the figures 3 and 4. The inner outlet 31 of the centering-cone is shaped in accordance to external form of the transmission means, ie. it has cylindrical form. Further, the transmission means 15 is provided with a peripheral flange 24, which forms the contact surface for a compression spring 25, purpose of which is to press the forward end-surface of the transmission means to bear on an opening 26 in a seat 27, which is provided at the front end of the holder 14. The seat 27 takes up a lens 28, the center axis of which coincides with the central longitudinal axis of the transmission means 15.

In the joined position of the connector parts 11a, 11b, one of the connector parts 11a of the transmission means 15 will be positioned right opposite to a corresponding transmission means 15 in the other connector part 11b, and to accomplish an exact coaxial coupling-up between the transmission means 15 in the both connector parts 11a and 11b, in one of the connector parts, for example 11b, the holders 14 upper end portion is provided with a guide-sleeve 31, which by means of forced-fit is permanently attached to the holder. The other holder 14 of the connector part 11a does not have a similar guide-sleeve, but it is however formed with a guide 32, which working-fit can be inserted in the guide-sleeve 31, so that the both holders with their transmission means 15 will be situated in exact coaxial position. Each individual holder 14 with transmission means 15 can consequently independently of the other holders in some coupling part in pairs be centered relative the other holder in the pair, which is possible by the holders being not rigidly fixed in each coupling part, but having a certain radial as well as axial mobility.

REFERENCE DESIGNATIONS 11a, b connector parts
12 nut
13 channel
14 holder—cylindric socket
15 transmission means
16 centering-cone
17 diode
18 shoulder
19 ledge
20 spring
21 holder-on
22 elastic sectors
23 material-reduced axial parts
24 peripheral flange
25 compression spring
26 opening
27 seat
28 lens
29 conical outlet in the holder
30 cylindrical outlet in the centering-cone
31 guide-sleeve
32 guide

We claim:

1. A multi-channel connector for coupling first and second fiber optic transmission means comprising:

a pair of mating connecting parts, each including a body;

each body having a front and a back end defining a longitudinal axis therebetween and having a channel extending longitudinally therethrough parallel to said axis, each body further including:

a tubular holder mounted within said channel having a lens seat adjacent said front end of said body, said holder has an inner conical surface tapering towards said lens and each said connecting part further includes a centering cone substantially complementary with said tapered surface of said holder positioned within said holder, said transmission means being positioned within said centering cone in axial alignment with said holder;

a lens positioned within said lens seat;

a transmission means, having a front end, mounted within said holder with said front end adjacent said lens, and a first spring operatively arranged within said holder to urge said front end of said transmission means towards said lens;

and means on the front end of each of said bodies adapted cooperatively to mate with each other and to retain said bodies with said channels in axial alignment.

2. A connector according to claim 1 wherein said first spring is positioned within said centering cone.

3. A connector according to claim 1, wherein said centering-cone is formed with elastic, peripheral sectors, consisting of relatively thinner axially extending parts, which are deformable.

4. A multi-channel connector for coupling first and second transmission means comprising:

a pair of mating connecting parts, each including a body;

each body having a front and a back end defining a longitudinal axis therebetween and having a channel extending longitudinally therethrough parallel to said axis, each body further including:

a tubular holder mounted within said channel having a lens seat adjacent said front end of said body, the holder having an inner conical surface tapering towards said front end of said body;

a first and a second spring, said second spring being operatively arranged between said body and said holder to urge said holder towards said front end of said body;

a lens positioned within said lens seat;

a transmission means, having a front end, mounted within said holder with said front end thereof adjacent said lens, said first spring being operatively arranged within said holder to urge said front end of said transmission means towards said lens;

a centering cone substantially complementary with said tapered surface of said holder positioned within said holder, said transmission means being positioned within said centering cone in axial alignment with said holder;

and a guide sleeve on one of said connecting parts and a guide on the other of said connecting parts adapted to engage and to maintain said front ends of said connecting parts in close proximity with the respective channels thereof in axial alignment and thereby said transmission means in axial alignment.

* * * * *